Figure 1:
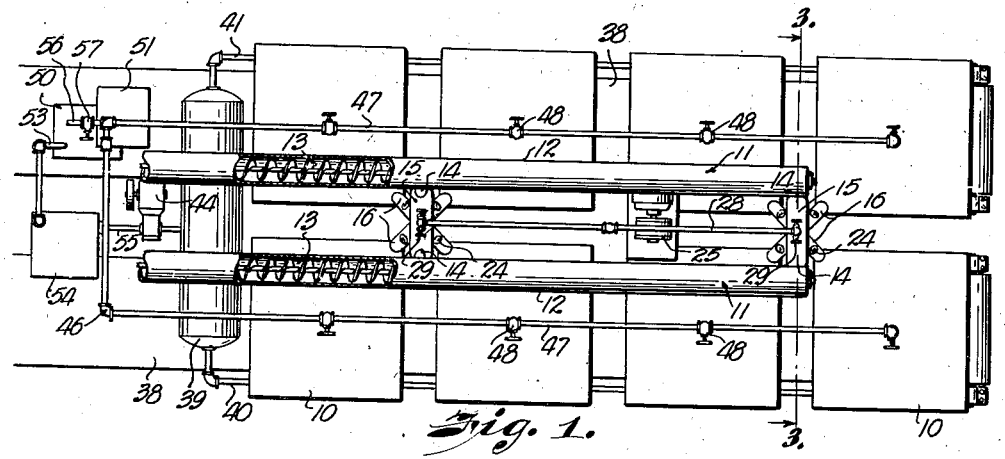

June 20, 1944.  W. R. GRAHAM, JR  2,351,853
APPARATUS FOR PRESERVING ORGANIC MATERIALS
Original Filed Oct. 18, 1941  2 Sheets-Sheet 1

INVENTOR.
William R. Graham, Jr.
BY Thos. E. Scofield
ATTORNEY.

June 20, 1944.   W. R. GRAHAM, JR   2,351,853
APPARATUS FOR PRESERVING ORGANIC MATERIALS
Original Filed Oct. 18, 1941   2 Sheets-Sheet 2

INVENTOR.
William R. Graham, Jr.
BY Thos. E. Scofield
ATTORNEY.

Patented June 20, 1944

2,351,853

UNITED STATES PATENT OFFICE 2,351,853

APPARATUS FOR PRESERVING ORGANIC MATERIALS

William R. Graham, Jr., Kansas City, Kans., assignor to American Dairies Incorporated, Kansas City, Mo., a corporation of Maryland, and The Quaker Oats Company, Chicago, Ill., a corporation of New Jersey, jointly Original application October 18, 1941, Serial No. 415,598. Divided and this application June 12, 1942, Serial No. 446,762

6 Claims. (Cl. 99—271)

My invention relates to improvements in an apparatus for preserving organic materials.

This is a divisional application of my co-pending application, Serial No. 415,598, filed October 18, 1941.

It is well known that organic materials such as forage crops, cereal grasses and vegetables are rich in vitamins, carotene and other labile substances. It is equally well known that such substances are easily oxidized and that, if any forage crop, cereal grass or vegetable containing these substances is exposed to the air for any substantial length of time, the vitamin, carotene and other labile content thereof may be materially reduced, if not entirely destroyed.

If materials of this sort are stored in refrigerated chambers, the rate of deterioration will be greatly reduced. However, this method of preservation is expensive and generally unsatisfactory for commercial purposes. If refrigerated storage space is rented, the storage charges are so high that it is impractical to keep the material in storage for an extended period. The initial cost of construction of refrigerated storage plus the subsequent high cost of maintenance and operation makes this solution of the problem commercially impractical.

I have found that, if the materials are stored in airtight bins from which the air has been exhausted or substantially exhausted, the vitamins, carotene and other labile substances in the material are preserved as in the refrigerated chamber. By exhausting the air from the bin, there remains insufficient oxygen therein to destroy the labile substances in the materials and the materials consequently may be stored in this manner for a considerable length of time. It is impractical, however, to use evacuated bins of a size to be of commercial value. Obviously a bin capable of holding tons of material would of necessity have to be sufficiently strong to withstand the pressure of the atmosphere after the air was exhausted therefrom. I propose, therefore, to replace the atmospheric air in the tank with a gaseous material which will not destroy the values of the stored material.

An important object of my invention, therefore, is to provide an improved apparatus for and method of preserving the health-giving vitamins, carotene and other labile values in the stored food products.

Another object of my invention is a method of the above mentioned character that is superior to any method heretofore devised for preserving the health-giving constituents of the material and that is much less expensive to operate than any method heretofore known.

A further advantage is the control of the moisture content in the stored material by regulation of the moisture content in the storing gas.

Storage of this type affords protection against rodents, insects and fire.

Other objects and advantages of my invention will be apparent during the course of the following description.

Figure 2:
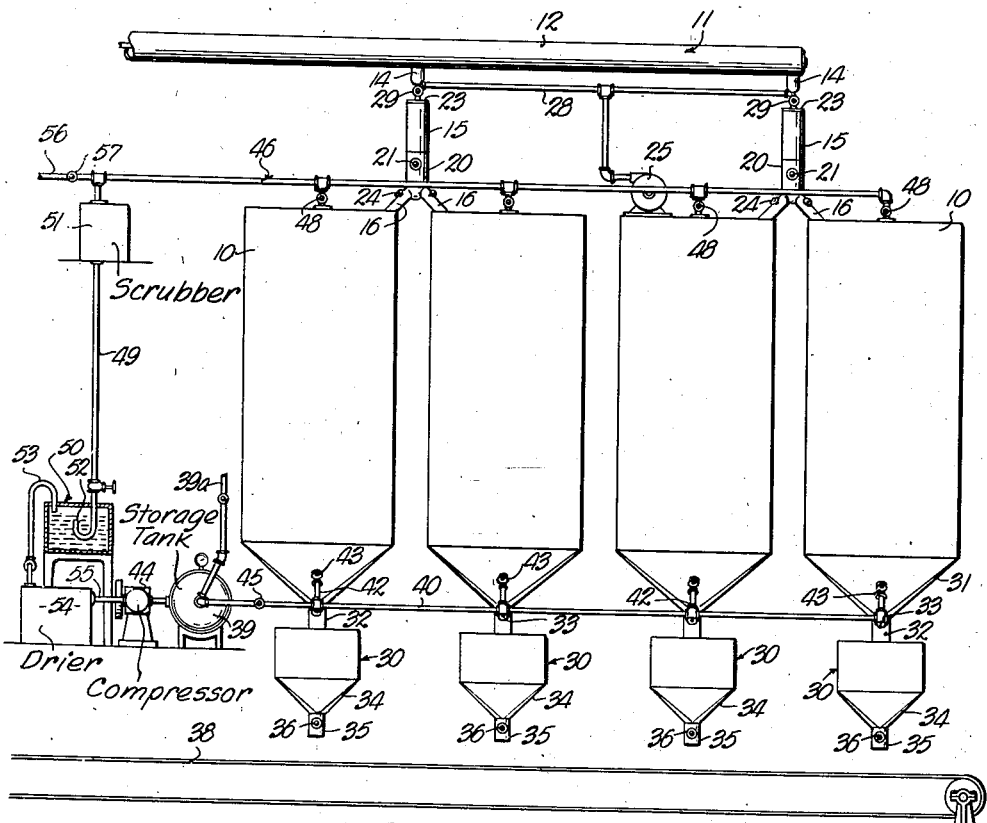
Figure 3:
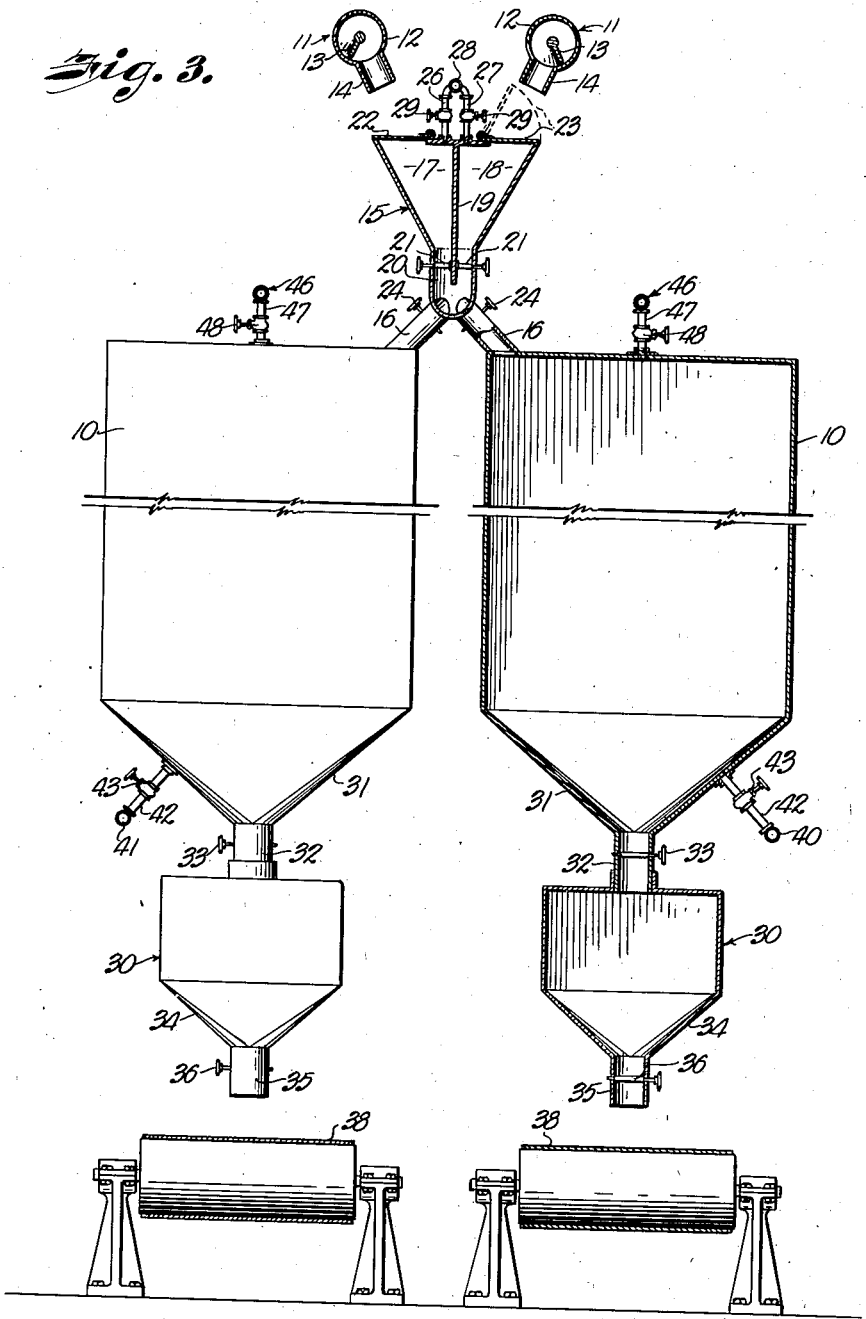

In the drawings forming a part of this specification and wherein like numerals are employed to designate like parts throughout the same, Fig. 1 is a top plan view of an apparatus embodying my invention, parts being broken away for clearness of illustration, Fig. 2 is a side elevation of the apparatus, parts thereof being broken away for clearness of illustration, and Fig. 3 is an end elevation of the same, parts being shown in section and parts in elevation.

In the accompanying drawings wherein, for the purpose of illustration, is shown a preferred embodiment of my invention, the numeral 10 designates a plurality of storage bins. I have here illustrated eight bins arranged in two parallel rows, each row containing four bins. It is to be understood, however, that any number of the bins may be grouped together and that the invention resides in the process as a whole and in the unique association and correlation of the several parts of the apparatus rather than in the number or arrangement of the storage bins. The bins are preferably of metal or gas impervious construction and may be supported in an upright position by any suitable means. Material to be stored is introduced through the tops of the bins which are entirely closed and of gas-tight construction.

Screw conveyors 11 are arranged above each row of bins and each conveyor comprises an outer cylindrical casing 12 having a helical screw 13 rotatably mounted therein. The casing is provided with a plurality of outlet pipes 14 which discharge into hoppers 15. Each of the outlet pipes is provided with a suitable valve so that the material carried by the conveyor may be introduced into a selected hopper. The apparatus is particularly adapted to preserve comminuted cereal grasses or vegetables and, before these products are stored, it is necessary that they be dehydrated. The conveyors transfer the materials to be stored from the dehydrator or other source of supply (not shown) to the gassing hoppers from which the materials fall by gravity into the storage bins.

In the construction here illustrated, each hopper 15 is arranged to supply material to four of the bins. Each hopper is, therefore, provided with four tubular extensions 16, each of which connects to and communicates with a respective one of the bins. Fig. 1 best illustrates the manner in which the hoppers are arranged to supply the respective bins and Fig. 3 best illustrates the specific construction of the hopper. Each hopper is divided into two compartments, 17 and 18, by a vertical partition wall 19. The lower edge of the partition terminates above the bottom of the hopper to provide a lower manifold portion 20. Valves 21 arranged at each side of the partition provide bottoms for each of the compartments 17 and 18 and the tops of the compartments are closed by hinged gas-tight covers 22 and 23, respectively. The covers may be raised, as illustrated by the dotted line in Fig. 3, to open the hopper and permit material from the screw conveyors to be introduced therein. The covers are formed to provide a sealed engagement with the body of the hopper when in the closed position so that the air in the hopper may be exhausted. It will be noted that the manifold portion 20 provides a common connection for each of the four extensions 16 and that each of the extensions is provided with a valve 24 so that the contents of the manifold may be directed into a selected one of the bins.

In practicing my invention, I provide the bins with a gas circulation system which removes the air therefrom, before the same have been filled with material to be stored, and replaces the air with an inert gas such as carbon dioxide or nitrogen. The bins are large and it is therefore necessary that the hopper be filled a number of times in filling the bins. I have provided means for exhausting the air from the hopper before the contents thereof are discharged into the storage bin. After one or both of the upper compartments 17 and 18 have been filled, the covers 22 and 23 are lowered into sealed engagement with the hopper body. When the material is being introduced into the hopper, the valves 21 are closed so material may not enter the manifold 20. A vacuum pump 25 communicates with the compartments of each hopper through the bifurcations 26 and 27 of pipe 28. Each of the bifurcations is provided with a shut-off valve 29, and, if desired, the air may be exhausted from but one of the compartments at a time. Therefore, after a hopper has been charged with material from a conveyor, the valve 29 is opened, and the pump 25 is operated to evacuate the air from the filled compartments of the hopper. The valve 24 controlling communication between the manifold and the bin to be filled is then opened and the valve 21 in the filled compartment is opened to permit the contents of the hopper to flow into the bin.

Each of the bins may be provided with a smaller container 30. The storage bins are tapered at their lower ends, as at 31, and terminate in a discharge neck 32. The neck is provided with a valve 33 for controlling the flow of material therethrough. Each of the discharge necks empties into one of the smaller containers 30 which are also provided with tapered bottoms 34 and discharge spouts 35. The spouts 35 are similarly provided with valves 36 by means of which flow of the material therethrough is regulated.

In practice I occasionally fill each of the bins with a different cereal grass or comminuted vegetable matter, in order that I may obtain a blend of these materials. This is accomplished by the simple expedient of opening the valves 33 and discharging a portion of the contents of the bins into the smaller containers 30, the discharge valves 36 from the latter being closed. By this expedient, contents of the bins are removed without ingress of air into the bins. After the material is drawn into containers 30, valves 33 are closed and valves 36 opened to deposit the material discharged from the bins onto conveyor belt 38. The conveyor belt passes below the spouts of containers 30 and will receive material discharged from the several bins. The endless belt leads to a suitable container (not shown) in which the materials are dumped and thoroughly mixed.

As hereinabove set forth, each of the bins is filled with an inert gas which displaces the air and which will not destroy the valuable carotene or vitamin content of the product stored in the bin. A storage tank 39 is mounted at one end of the bins and pipes 40 and 41 extend from each end thereof and below the bins. The pipes 40 and 41 are provided at spaced intervals therealong with branch lines 42 which connect to the respective bins. Each of the lines 42 is provided with a valve 43 so that the gases supplied through the pipes may be directed into a selected one of the bins. Gas under pressure is supplied to the storage tank by means of a compressor 44 and each of the pipes 40 and 41 is provided with a pressure reduction valve 45. The compressor maintains the gas in the storage tank at or above a predetermined pressure and the pressure reduction valves 45 are set to admit gas when pressure in the bins drops below a predetermined minimum pressure. The valves 43 in the branch connections 42 of the filled bins are normally open. As long as the gas pressure in the bins remains constant, the pressure valves 45 remain closed. As gas escapes from the bins or pressure reduction results from any cause, the pressure valves will permit gas from the storage tank to enter the bins and raise the pressure of the gas to the requisite pressure.

Gas escapes from the bins through a pipe 46 arranged above the tops of the bins and connected therewith by branch pipes 47, each of which is provided with a valve 48. The pipe 46 is essentially U-shaped and has each branch 47 disposed above one row of the bins. A depending pipe 49 connects the U-shaped manifold 46 to a pressure valve or sealing chamber 50. If the bins are empty, valves 48 are closed. However, if a bin is filled with stored material, the valves are open so that the gaseous contents of the bin may pass from the bin into pipe 46. Fluctuations in temperature will cause the gas in the bin to expand and contract. To relieve excess pressure in the bins, caused by expansion of the gases, valves 48 remain open, permitting gas to escape from the bin into the pressure valve via pipes 46 and 49. However, before the gases are permitted to enter the pressure valve, they traverse a scrubbing chamber 51 wherein they pass through an oxygen absorbent such as sodium hydrosulfite solution, an alkaline pyrogallic acid solution, or any method that will remove free oxygen from the gas.

The pressure valve or sealing chamber comprises a hollow box-shaped container which is entirely closed and partially filled with a liquid solution of water, oil, or the like. The lower end of pipe 49 extends into the liquid in the container and is upturned with the open end 52 normally disposed below the level of the liquid. Gases passing from the pressure valve are discharged through pipe 53 which leads into a suitable drier 54 where moisture carried by the gases is removed. The drier is connected to the suction side of the compressor 44 by means of a tubular coupling 55.

Inert gas charged to the empty bins 10 displaces atmospheric air therein which exits through pipe 46. This air is vented from the system through a discharge pipe 56 controlled by valve 57. In practice, valve 57 is left open until gas begins to discharge, at which time the valve is closed so that the gas and the remaining air are circulated back to the storage tank 39.

The pressure setting on valves 45 is correlated with the back pressure maintained on the gas system by pressure valve 50 to maintain a predetermined gas pressure upon the storage bins. The inert gas is supplied to the system at any convenient point preferably to the storage tank 39 as shown at 39a.

The operation of the compressor is dependent upon and is controlled by the bin pressure; in other words, excessive bin pressure is exhausted and charged into the storage tank by the compressor until the bin pressure is brought back to the pressure valve on pressure valve 50. As previously described, pressure reduction in the bins is augmented by gas from the storage tank according to the setting on valves 45. The mechanism for operating the compressor has been omitted in the interests of simplifying the drawings and description, controls of this sort being conventional.

It is to be understood that any inert gas which will not oxidize the vitamin C and carotene content of the material stored in the bins may be used. In actual practice, I prefer to use carbon dioxide gas for the reason that it is relatively inexpensive.

If the first bin to the left in the lower row as seen in Fig. 1 is to be filled, the cover 22 of the first hopper is raised and the outlet pipe 14 positioned to discharge material into compartment 17. Valve 21 and valves 24 leading to the other bins are closed. As soon as chamber 17 has been fully charged, the cover 22 is lowered and the vacuum pump 25 is operated to evacuate the same. Valve 21 is then opened to permit the contents of the hopper to discharge into the bin.

Prior to charging the bin, the system has been filled with the inert gas.

The reason for evacuating the hopper is to eliminate or reduce to a minimum the ingress of oxygen-containing air to the bins with the material to be stored. After the system is completely filled with the inert gas, recycling takes place due to differentials in pressure; and, should it be desired to purge the system of traces of oxygen or oxygen-containing gas, the entire system or any selected bins may be recycled by manipulation of the valves in the connecting lines and operation of the compressor.

As described, the storage tank 39 and pressure valves 45 will thereafter maintain the gas in the bins at substantially the requisite pressure and the pressure valve or sealing chamber 50 will accommodate increases in pressure due to expansion.

In the description of the storage system, materials of the nature of dehydrated forage crops, cereals, gasses and comminuted vegetables, have been suggested as the materials to be stored. It is contemplated as well to store any substance which deteriorates in the presence of oxygen, including all types of food products and reaction chemicals also materials subject to infestation by insects and animals.

It has been found that the storing of products in a system of this type destroys insect eggs provided a sufficiently high vacuum is used in exhausting the air preliminarily from the charging hoppers.

As a result of exhaustive research and experimentation, I have found that nitrogen gas or carbon dioxide gas provides satisfactory results. It is to be understood that any inert gas may be used and that nitrogen and carbon dioxide are given merely by way of example. Carbon dioxide is preferred because it is the least expensive and therefore the most practical for commercial purposes.

The following is a table setting forth the carotene and vitamin C content of a powdered cereal grass before storage and after storage for approximately two months. In order to make the test as complete as possible for comparative purposes, I stored a portion of the material in a container exposed to the air, another portion in a refrigerated chamber, a third portion in a container in which the atmospheric air had been replaced by carbon dioxide gas and a fourth portion in a container from which the air had been exhausted and replaced by nitrogen gas.

*Powdered cereal grass*

|  | Characteristics of product at time of storage | Characteristics of product after storage for approximately two months |
|---|---|---|
|  | Mg. per 100 grams of material | Mg. per 100 grams of material |
| Storage without attempt at preservation: |  |  |
| Carotene | 66–68 | 31.0 |
| Vitamin C | 500–530 | 226 |
| Storage without refrigeration: |  |  |
| Carotene | 66–68 | 61.0 |
| Vitamin C | 500–530 | 548 |
| Storage with CO$_2$: |  |  |
| Carotene | 66–68 | 61.5 |
| Vitamin C | 500–530 | 516 |
| Storage with nitrogen: |  |  |
| Carotene | 66–68 | 64 |
| Vitamin C | 500–530 | 565 |

The tests by which the vitamin C and carotene contents of the materials were determined were carefully conducted in accordance with the recognized procedure, but even the results may show as much as five per cent error. The figures given above, however, represent averaged results of a series of tests and therefore, for comparative purposes at least, may be considered to be accurate.

At the present time, the cost of storing materials of this nature in refrigerated storage bins is relatively high. I have found that, by employing the method hereinabove described, the materials may be preserved as well as in refrigerated storage and at a substantially lower cost. Storage costs have been an important factor in this art and have greatly hindered its development. By using the above described apparatus and method, large quantities of material may be stored at a relatively low cost and thus provide the art with a much needed expedient.

It is to be understood that the form of the invention herewith shown and described is to be taken as a preferred example of the same and that various changes in the size, shape and arrangement of parts may be resorted to without departing from the spirit of my invention or the scope of the appended claims.

Having thus described my invention, I claim:

1. In an apparatus for storing and preserving material containing vitamins or carotene, the combination of a closed storage bin, a hopper for receiving material to be discharged into the bin, means for sealing the hopper, means for exhausting air from the hopper, valve means for controlling communication between the hopper and bin, and means for circulating a gaseous fluid through the said bin.

2. The combination as set forth in claim 1 wherein the fluid circulating means includes a compressor, conduits extending from the inlet and outlet of the compressor connected to and communicating with the bin, sealing means in the inlet conduit, a storage tank in the said outlet conduit, and a pressure reduction valve inserted in the outer conduit intermediate the tank and bin.

3. The combination as set forth in claim 1 wherein the fluid circulating apparatus includes a compressor, conduits extending from the inlet and outlet of the compressor connected to and communicating with the bin, means in the inlet conduit for removing oxygen from the fluids traversing the same, sealing means in the inlet conduit, a storage tank in the said outlet conduit, and a pressure reduction valve inserted in the outlet conduit intermediate the tank and bin.

4. An apparatus for storing and preserving organic materials comprising a plurality of storage bins, a hopper having a receiving chamber and a manifold portion, a valve separating the chamber from the manifold portion, tubular extensions communicating between the manifold portion of the hopper and each of the said bins, a valve in each of the tubular extensions, and means for exhausting air from the receiving chamber of the hopper.

5. In an apparatus for storing and preserving organic material, the combination of a closed storage bin, means for introducing an organic material into the bin, said means comprising a supplemental closed chamber having valved communication with the bin and means for controlling the atmosphere in the supplemental chamber, a gas circulation system for conducting inert gas to and from the storage bin, said system including a storage tank for receiving gas discharged from the bin and a pressure regulating valve responsive to pressure variations in the bin for controlling flow of gas from the storage tank to the bin.

6. In an apparatus for storing and preserving organic material subject to deterioration during storage, the combination of a closed storage bin, means for introducing an organic material thereto, said means comprising a supplemental closed chamber having valved communication with the bin and means for controlling the atmosphere in the supplemental chamber, a gas circulation system for replacing the atmospheric air in the bin with an inert gas, the said system including a discharge for venting the system during introduction of the inert gas, means for removing oxygen from the gas during the circulating period and means for maintaining a constant pressure in the bin.

WILLIAM R. GRAHAM, Jr.